United States Patent [19]

Pare et al.

[11] Patent Number: 5,389,248
[45] Date of Patent: Feb. 14, 1995

[54] BIOREACTOR FOR BIOLOGICAL TREATMENT OF CONTAMINATED WATER

[75] Inventors: François Paré, Montreal; John Hart, Fredericton, both of Canada

[73] Assignee: Bioremetek, Inc., Montreal, Canada

[21] Appl. No.: 66,308

[22] Filed: May 21, 1993

[51] Int. Cl.$^6$ .............................................. C02F 3/10
[52] U.S. Cl. ................... 210/151; 210/180; 210/194; 210/521; 95/274
[58] Field of Search ............... 210/615, 616, 150, 151, 210/180, 194, 521; 261/112.1, 112.2; 95/274, 900

[56] References Cited

U.S. PATENT DOCUMENTS

| | | | |
|---|---|---|---|
| 936,464 | 10/1909 | Lucas | 210/150 |
| 2,992,986 | 7/1961 | Ingram | 210/150 |
| 3,112,261 | 11/1963 | Porter et al. | 210/17 |
| 3,260,511 | 7/1966 | Greer | 261/112 |
| 3,403,095 | 9/1968 | Chipperfield et al. | 210/17 |
| 3,618,778 | 11/1971 | Benton et al. | 210/150 |
| 3,876,542 | 4/1975 | Carlson | 210/150 |
| 4,002,705 | 1/1977 | McKeow | 261/98 |
| 4,160,736 | 7/1979 | Prosser | 210/150 |
| 4,197,205 | 4/1980 | Hirs | 210/275 |
| 4,311,593 | 1/1982 | Benjes et al. | 210/603 |
| 4,396,507 | 8/1983 | Grant | 210/150 |
| 4,537,678 | 8/1985 | Thissen | 210/150 |
| 4,549,962 | 10/1985 | Koelsch | 210/150 |
| 4,599,168 | 7/1986 | Benjes et al. | 267/151 |
| 4,666,593 | 5/1987 | Bosne | 210/150 |
| 4,915,841 | 4/1990 | Lagana et al. | 210/605 |
| 4,940,540 | 7/1990 | McDowell | 210/150 |
| 5,049,266 | 9/1991 | Gotz et al. | 210/151 |

FOREIGN PATENT DOCUMENTS

| | | |
|---|---|---|
| 1061241 | 8/1979 | Canada . |
| 1240631 | 8/1988 | Canada . |
| 1143684 | 3/1989 | Canada . |
| 3716637A | 5/1987 | Germany . |
| 53-070552 | 6/1976 | Japan . |

OTHER PUBLICATIONS

O. J. Hao et al., "Peat As An Agent In Biological Degradation: Peat filters", *Research Journal WPCF* 63(4): 388–394 (1991).

A. M. Martin, "Biological fixed-film systems", *Research Journal WPCF* 4): 388–394 (1991).

(List continued on next page.)

*Primary Examiner*—Thomas Wyse
*Attorney, Agent, or Firm*—Fisher & Associates

[57] ABSTRACT

The invention relates to a bioreactor unit for the aerobic biological treatment of hydrocarbon contaminated waste water and off-gases. The bioreactor comprises a biotreatment chamber comprising a vertically extending housing unit forming the walls, floor and ceiling of the biotreatment chamber. The housing unit also comprises a door for accessing the biotreatment chamber. The biotreatment chamber also comprises waste water inlet means for discharging waste water under pressure from the upper portion of the biotreatment chamber, onto a plurality of superimposed water treatment trays disposed substantially horizontally inside the chamber, the water treatment trays being adapted for retrieval from the biotreatment chamber through the door of the housing unit. Each water treatment tray has at least one bottom porous section adapted to receive contact media. The contact media on the porous section of the water treatment trays acts to retain and favor the growth of microorganisms having the ability to degrade hydrocarbons. The water treatment trays are disposed in the biotreatment chamber in a stationary relationship during treatment to permit intimate successive contact of waste water and off-gases with contact media on each of the trays for gradual treatment of the waste water, as the waste water flows downwards in the biotreatment chamber. The biotreatment chamber also comprises a water outlet substantially at the bottom of the biotreatment chamber for discharging treated waste water, air flow means to create an aerobic environment in the biotreatment chamber, air flow means being adapted to provide an air flow through the water treatment trays and air outlet means for removing air introduced in the biotreatment chamber through the air flow means.

16 Claims, 8 Drawing Sheets

OTHER PUBLICATIONS

Groundwater Technology, Inc., "On-site Treatment of Groundwater and Hazardous Waste Using Fixed-Film Bioreactors", presented at Ensol 90, Santa Clara Convention Center, Santa Clara, Calif., Sep. 12–14. 1990.

*Understanding Bioremediation*, U.S. Environmental Protection Agency, EPA/540/2-91/002, Feb. 1991.

N. E. Kinner et al., Journal WPCF 61(6):807–810 (1989).

O. J. Hao et al., Research Journal WPCF 62(4):406–413 (1990).

D. Gutnik, *Bioremediation of Marine Oil Pollution*, Transport Canada Publication No. TP 11261E, pp. 29–32, Nov. 1991.

FIG. 8

BIOREACTOR FOR BIOLOGICAL TREATMENT OF CONTAMINATED WATER

FIELD OF THE INVENTION

The present invention relates to a bioreactor for the biological treatment of hydrocarbon-contaminated water and off-gases released therefrom. More particularly, the invention relates to a self-contained biological treatment unit in which contaminated water flows through a plurality of treatment trays supporting contact media. Suitable bacterial growth conditions on the contact media within an enclosed aerobic environment inside the bioreactor results in the efficient biodegradation of contaminants.

BACKGROUND OF THE INVENTION

The need to treat cost effectively water contaminated by hydrocarbons is important in light of increasingly onerous environmental protection regulations.

There are many different methods by which water contaminated by hydrocarbons is currently being treated. These methods are primarily categorized as physical, chemical and biological methods.

Physical methods include air stripping such as tray or packed tower type air strippers; carbon adsorption onto granulated activated charcoal (GAC) units; and, to a lesser extent, ion exchange units and membrane separation (reverse osmosis process).

Chemical methods include precipitation and oxidation/reduction methods.

Biological methods are in wide use today and can be either categorized as aerobic or anaerobic processes. The more common systems are aerobic which are considered to be more effective as they convert the contaminants into innocuous substances. Aerobic systems can generally be designated as suspended growth or fixed film processes.

Suspended growth processes are also referred to as activated sludge type processes where free floating biological flocks are uniformly suspended by aeration in a liquid phase throughout a reactor, thus providing optimal contact of the flocks with the required air and contaminants dissolved in the water.

In a fixed film process, such as a trickling filter, the biomass is attached to a fixed or immobile medium or matrix within the reactor. The waste water is passed over biological slimes grown on and attached to stationary surfaces. These surfaces, also known as trickling filter media, can take various shapes and forms and are often made of plastic or other synthetic materials. Examples of trickling filter media are shown in U.S. Pat. No. 3,403,095, U.S. Pat. No. 3,260,511, Canadian Patent No. 1,061,241 and Canadian Patent No. 1,143,684. The latter patent describes a reactor wherein contaminated water passes downwards through a bed of synthetic packing media, with treated liquid being withdrawn from the bottom of the reactor.

Aerobic biological processes employing partially submersed beds are also used with stationary or, alternatively, moving media such as moving biological contact surfaces, or "contactors". Moving contact media surfaces typically involve rotating surfaces partially submersed in waste water held in a tank and, in many cases, are moving within a rotating cylindrical chamber. Rotating contact media surfaces are intermittently exposed to waste water and to oxygen from the overlying atmosphere, thereby degrading organic constituents in the waste water. Media used are often of metal or plastic construction of various shapes and forms. Examples of such moving contact surfaces are shown in U.S. Pat. No. 4,160,736 "Rotating Trickling Filter", U.S. Pat. No. 4,537,678 "Rotary Biological Contactor" and U.S. Pat. No. 4,549,962 "Rotating Biological Contactor".

Other fixed film bioreactor designs involve wholly submersed or pressurized water systems in which waste water passes downward or upward through contact media surfaces within a bioreactor chamber. Media are often composed of plastic like forms or structures and air is usually bubbled into the base of the bioreactor. An example of such an apparatus is described in a paper entitled "On-site Treatment of Groundwater and Hazardous Waste Using Fixed-Film Bioreactors" presented by Groundwater Technology, Inc. at EnSol 90, Santa Clara convention Center, Santa Clara Calif., Sep. 12–14, 1990. A further example is described in U.S. Pat. No. 4,396,507 "Ribbon Tube Biofilter".

Practices of known prior art teach that, for water contaminated by hydrocarbons, the most useful treatment methods which will satisfy increasingly stringent environmental standards set by regulatory bodies are those which employ naturally occurring microorganisms in submersed or partially submersed reactors to degrade hydrocarbons in an aerobic environment, usually assisted by polishing units, such as granular activated charcoal units, to remove residual traces of organics remaining in the water.

However, treatment processes and the devices used in connection with such processes must strike a balance of economy in construction, operation, maintenance, portability and compliance with minimum emission standards.

There is a need today for a hydrocarbon-contaminated waste water treatment apparatus which best optimizes cost efficiencies in construction, operation, maintenance and portability. Furthermore, such an apparatus must minimize contaminant transfer into the ambient air and be capable of degrading heavier hydrocarbons. Such an apparatus is especially needed for treatment of low water flow rates found in the remediation of polluted properties or effluents from oil-water separator vessels used in the petroleum industry, particularly in operating service stations and bulk plants. In addition, bioreactors that meet hydrocarbon waste effluent treatment standards should have the capability of operating during cold weather without adversely affecting the efficiency of the treatment process.

SUMMARY OF THE INVENTION

In light of the foregoing, one of the main objects of this invention is to provide an apparatus for treating, in a practical and cost-effective manner, water contaminated by hydrocarbons.

In one of its broadest aspects, the invention relates to a bioreactor unit for the aerobic biological treatment of hydrocarbon contaminated waste water and off-gases. The bioreactor comprises a biotreatment chamber comprising a vertically extending housing unit forming the walls, floor and ceiling of the biotreatment chamber. The housing unit also comprises a door for accessing the biotreatment chamber. The biotreatment chamber also comprises waste water inlet means for discharging waste water under pressure from the upper portion of the biotreatment chamber, onto a plurality of superimposed water treatment trays disposed substantially horizontally inside the chamber, the water treatment trays being adapted for retrieval from the biotreatment chamber through the door of the housing unit. Each water treatment tray has at least one bottom porous section adapted to receive contact media. The contact media on the porous section of the water treatment trays acts to retain and favour the growth of microorganisms having the ability to degrade hydrocarbons. The water treatment trays are disposed in the biotreatment chamber in a stationary relationship during treatment to permit intimate successive contact of waste water and off-gases with contact media on each of the trays for gradual treatment of the waste water, as the waste water flows downwards in the biotreatment chamber. The biotreatment chamber also comprises a water outlet substantially at the bottom of the biotreatment chamber for discharging treated waste water, air flow means to create an aerobic environment in the biotreatment chamber, air flow means being adapted to provide an air flow through the water treatment trays and air outlet means for removing air introduced in the biotreatment chamber through the air flow means.

The biotreatment chamber optionally comprises biofilter means located above the waste water inlet means for the treatment of volatilizing off-gases released from the discharging waste water. Preferably, the biofilter means consist of a plurality of superimposed off-gas treatment trays also disposed substantially horizontally in the biotreatment chamber and being adapted for retrieval from the biotreatment chamber through the door of the housing unit. Each off-gas treatment tray has at least one bottom porous section adapted to receive contact media and preferably a top porous section adapted to retain contact media when exposed to an upwards air flow, the contact media acting to retain and favor the growth of microorganisms having the ability to degrade volatile hydrocarbons released from the waste water as off-gases. The trays are disposed in the biotreatment chamber in a stationary relationship during treatment to permit successive contact of off-gases with contact media on each of the off-gas treatment trays for gradual treatment of the off-gases, as the off-gases flow upwardly in the biotreatment chamber.

The bioreactor unit of the present invention can also optionally include an accessory compartment adjacent to and sealed from the biotreatment chamber. The accessory compartment comprises ancillary equipment operatively linked to the waste water inlet means and the air flow means to allow operation of the bioreactor, preferably to render the bioreactor fully operational as a stand-alone, self-contained apparatus. The ancillary equipment includes components required to ensure optimal operation conditions in the biotreatment chamber.

Also optionally, the bioreactor unit of the present invention comprises containment means for capturing precipitated metals in the waste water to be treated. The containment means are preferably in the form of a plurality of sedimentation cups disposed on a horizontal sedimentation tray which is located between the waste water inlet and the water treatment trays. The removal of precipitating metals from the waste water serves at least two purposes. Firstly, it avoids toxicity problems with regard to the microorganisms growing on the contact media. Secondly, it reduces fouling of the contact media with precipitating metals and biological slime, which would create channelling and inefficiency in the biotreatment process.

The invention provides for an efficient device and method to treat hydrocarbon contaminated water and off-gases at relatively low capital and operating costs in a practical, portable and fully enclosed apparatus. Furthermore, it may be operated throughout the year, even during cold weather periods of northern climates.

While the embodiments of this invention will be described as they apply to hydrocarbon-contaminated water and off-gas treatment, it is intended that they be extended to such practical applications as the injection of treated water containing high levels of selective organisms onto and into contaminated soil to enhance the degradation of hydrocarbons contained therein.

DESCRIPTION OF PREFERRED EMBODIMENTS

Figure 1:
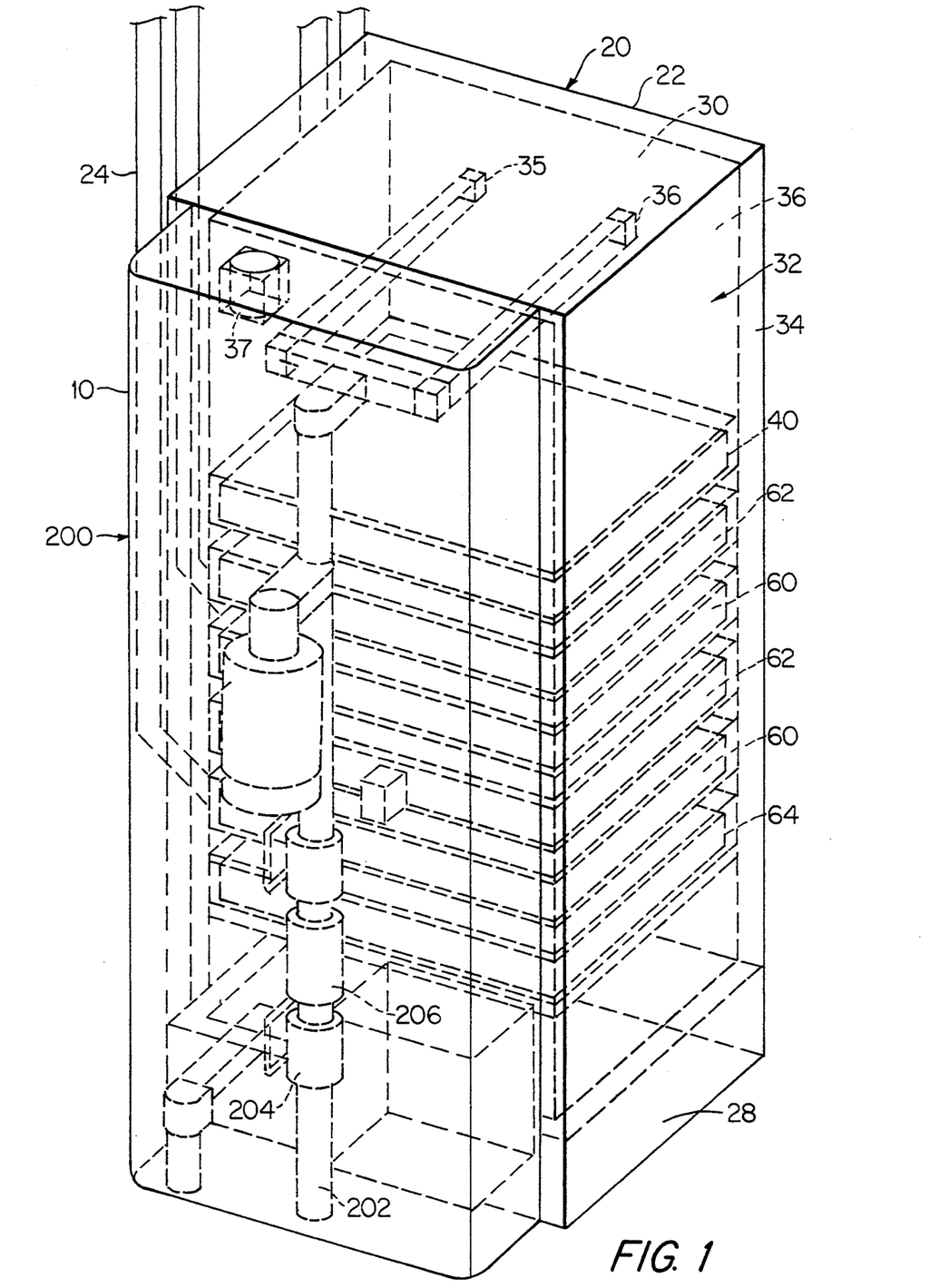
FIG. 1 is a rear pictorial view of one embodiment of a bioreactor unit of the invention.

Referring to FIG. 1, one embodiment of the bioreactor unit of the present invention, generally designated by reference numeral 10, comprises a biotreatment chamber 20 and an accessory compartment 200. In order to simplify the description of the bioreactor as much as possible, reference numerals 12 to 199 refer to components of biotreatment chamber 20 and reference numerals 200 to 250 refer to components of accessory compartment 200.

Biotreatment chamber 20 includes a vertically extending housing unit 22, the inside of which is accessible through hinged door 24. The inner walls 26, inner floor 28 and ceiling 30 of housing unit 22 are made of plastic hydrocarbon-resistant materials. Exterior walls 32 and finishings are generally made of sheet metal with 2–3.5 inches (5–9 cm) of insulation 34 between the inner walls 26 and the exterior walls 32. Inside biotreatment chamber 20 are located waste water inlets 35 and 36, air inlet 37, and a plurality of sedimentation trays 40 and 42, and water treatment trays 60, 62 and 64, which are shown in further detail at FIG. 3.

Accessory compartment 200 houses the required equipment to ensure optimal operational conditions of the biotreatment chamber. This equipment includes water inlet pipe 202 connected to water inlets 35 and 36 for incoming hydrocarbon contaminated water, strainer 204 for filtration, nutrient dispenser reservoir 206, means for supplying fresh air (not shown) and measuring and controlling temperature conditions of the biotreatment chamber and various electrical means (not shown) to support the operation of the bioreactor.

The biotreatment chamber and accessory compartment combine to provide a vertically disposed cabinet-like bioreactor. This bioreactor is thus a fully self-contained light weight hydrocarbon treatment unit that can be transported easily to various treatment sites. The only external requirement is a power source. No protective shelter is required. The simplicity of the design and operation of the bioreactor permits contaminated water to be treated very cost effectively compared to other treatment alternatives. The low cost of the bioreactor allows for a much broader use of hydrocarbon treatment technology heretofore considered almost cost prohibitive.

Figure 2:
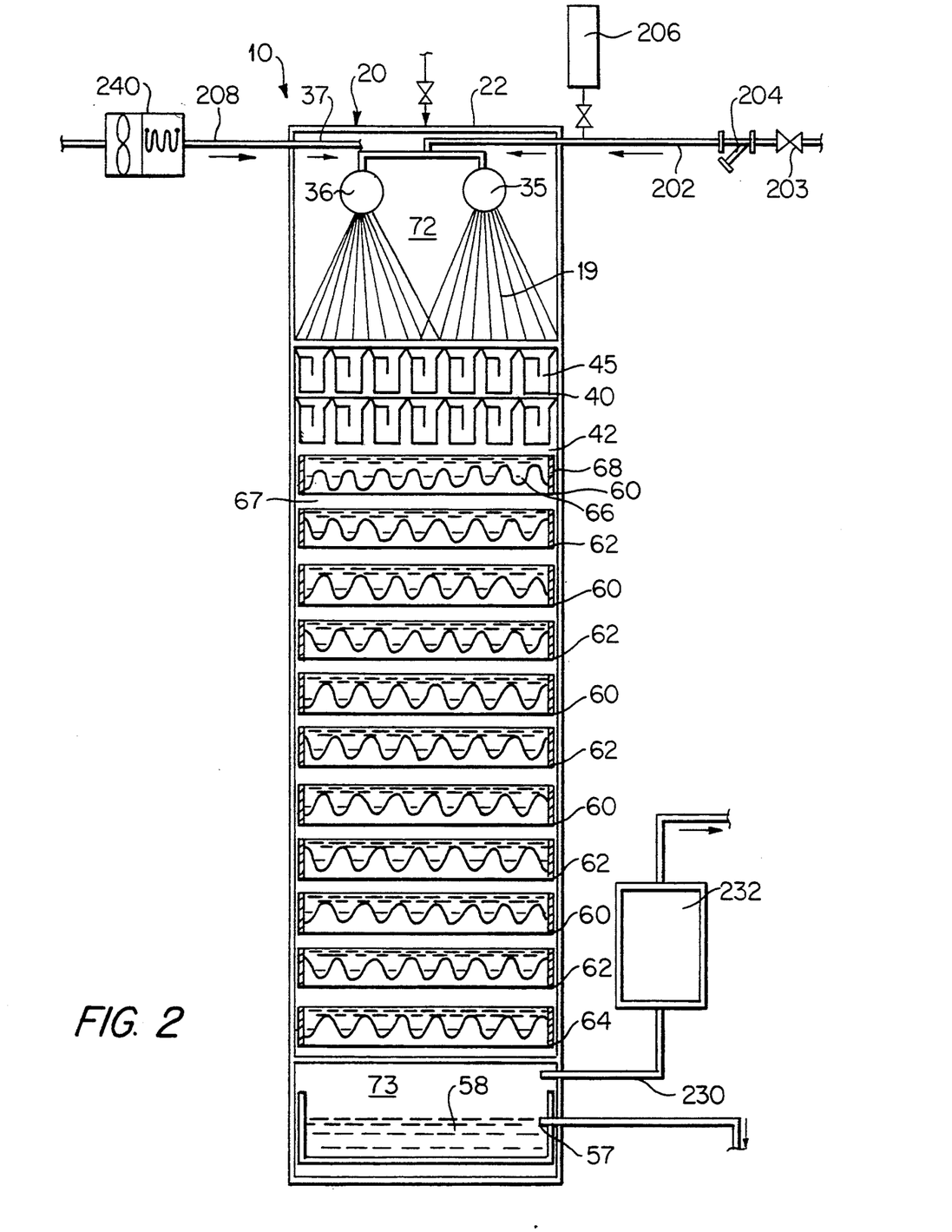
FIG. 2 is a schematic front view in section of the embodiment of the bioreactor unit of the invention shown in FIG. 1.

In FIG. 2, bioreactor unit 10 is shown schematically in further detail. It comprises a biotreatment chamber 20 which includes vertically extending housing unit 22, waste water inlets 35 and 36 connected by water inlet pipe 202 to valve 203 and strainer 204 for removal of sediments. Water inlet pipe 202 is also linked to nutrient dispenser 206.

Figure 5:
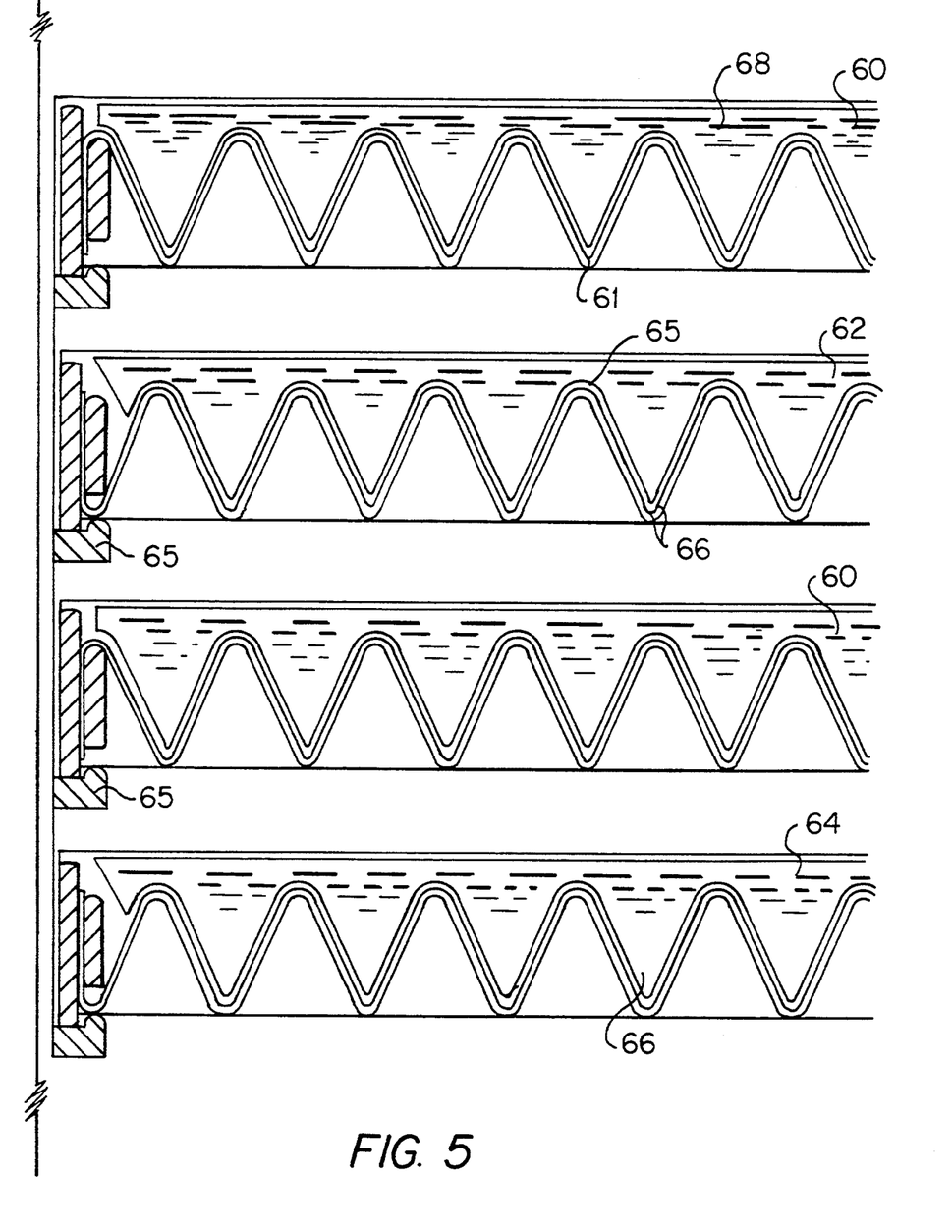
FIG. 5 is a partial cross-sectional front elevation of four water treatment trays in the bioreactor unit of the invention.
Figure 6:
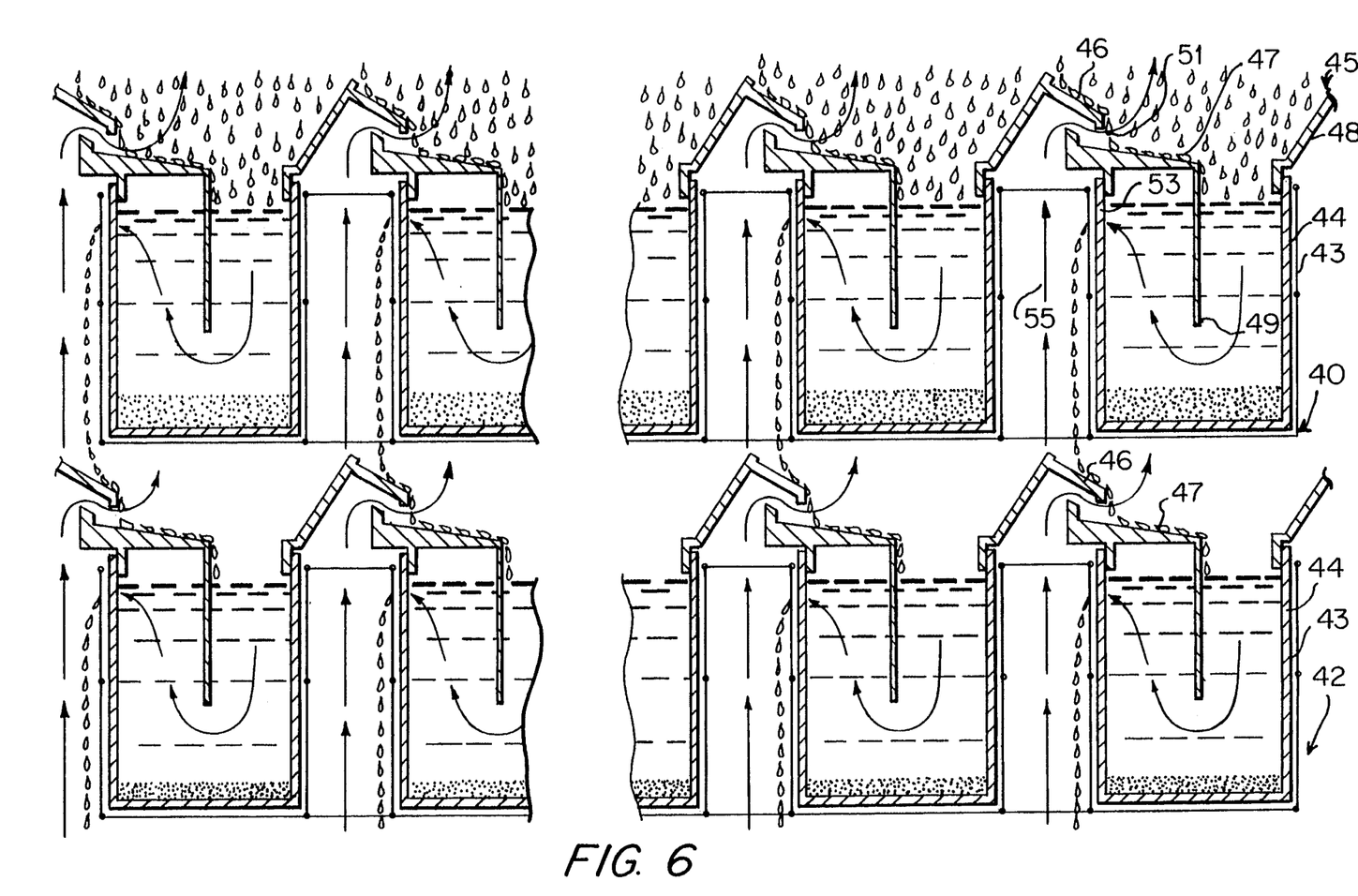
FIG. 6 is a cross-sectional front elevation of two sedimentation trays of the embodiment of the bioreactor unit of the invention shown in FIGS. 3 and 4.
Figure 7:
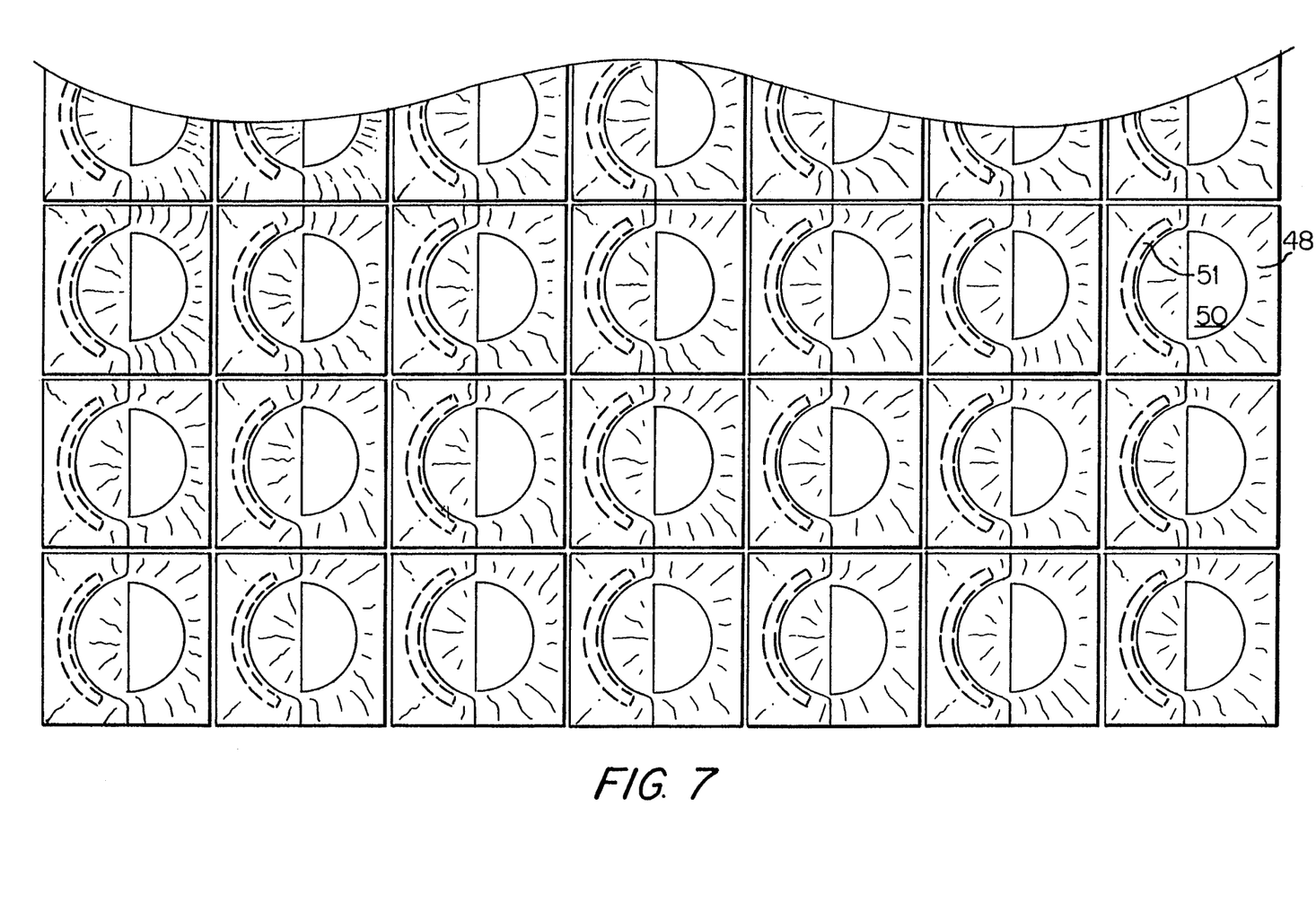
FIG. 7 is a partial top view of one sedimentation tray of the embodiment of the bioreactor unit of the invention shown in FIGS. 3, 4 and 6.

Biotreatment chamber 20 includes two sedimentation trays 40 and 42 which each comprise a plurality of sedimentation cups 44 which are described in further detail at FIGS. 6 and 7. Within biotreatment chamber 20 there is also a plurality of water treatment trays identified by reference numerals 60, 62 and 64. Each of water treatment trays 60, 62 and 64 has a porous bottom section 66 adapted to receive contact media bed 68 which consists of naturally occurring vegetation having a high surface area to volume characteristic to allow for optimal biological activity. Sedimentation trays 40 and 42 and treatment trays 60, 62 and 64 in biotreatment chamber 20 are separated from each other by vapor spaces 67 and are removable in drawer-like fashion when bioreactor unit 10 is not in operation. Water treatment trays 60, 62 and 64 are described in further detail at FIG. 5.

Heater fan 240 is located at the top portion of biotreatment chamber 20. Heater fan 240 is connected to air pipe 208 for release of air in vapor space 72 through air inlet 37. The bottom portion of biotreatment chamber 20 also provides a vapor space 73. Gas outlet 230 is located in the bottom portion of biotreatment chamber 20 and is connected to gas polishing unit 232.

When it is desired to operate the bioreactor unit shown in FIG. 2, pressurized hydrocarbon contaminated waste water is pumped towards biotreatment chamber 22 through inlet pipe 202, valve 203 and strainer 204 for removal of sediments. If desired, nutrients may be loaded to the waste water from nutrient dispenser 206 before the waste water is discharged under pressure through waste water inlets 35 and 36 downwards to sedimentation trays 40 and 42. Waste water inlets 35 and 36 discharge contaminated water jets 19 equally across sedimentation tray 40 to favor optimal recovery of precipitated metals prior to the biological treatment. Water then flows downwards onto sedimentation tray 42 and trickles downward onto water treatment tray 60.

Once waste water has reached water treatment tray 60, it passes through contact media bed 68 on water treatment tray 60 and flows through porous section 66 onto contact media bed 68 supported by water treatment tray 62 and continues in like fashion from one successive water treatment tray to another. Microorganisms on contact media bed 68 consume contaminants present in water or air during normal metabolic activity, thereby converting organic pollutants to biomass cell material, carbon dioxide and water. These microorganisms are predominantly naturally occurring strains of soil bacteria such as pseudomonas and corynebacterium. The hydrocarbon-consuming strains are predominant on the contact media beds. In order to maintain the growth of the microbial population present on the contact media bed 68, heater fan 240 is activated to supply fresh ambient air. The fresh air enters into vapor space 73 and is forced downwards through water treatment trays 60, 62 and 64. Treated water passing through bottom treatment tray 64 and captured in effluent basin 58 is then discharged from biotreatment chamber 21 through water outlet 57 for disposal into a sewer system or water course or for reinjection into the soil.

When treating hydrocarbon contaminated waste water using the bioreactor of the present invention, excess bacterial mass is sheared off the contact media and carried off with the treated water. The effluent water therefore contains high loads of specific strains of naturally occurring hydrocarbon consuming bacterial which can enhance the treatment of hydrocarbon contaminated soil or water.

Treated gases exit at the bottom of biotreatment chamber 21 from vapor space 73 immediately above effluent basin 58 through gas outlet 230. Gas outlet 230 leads gases to gas polishing unit 232 for final treatment prior to being discharged into the atmosphere.

Figure 3:
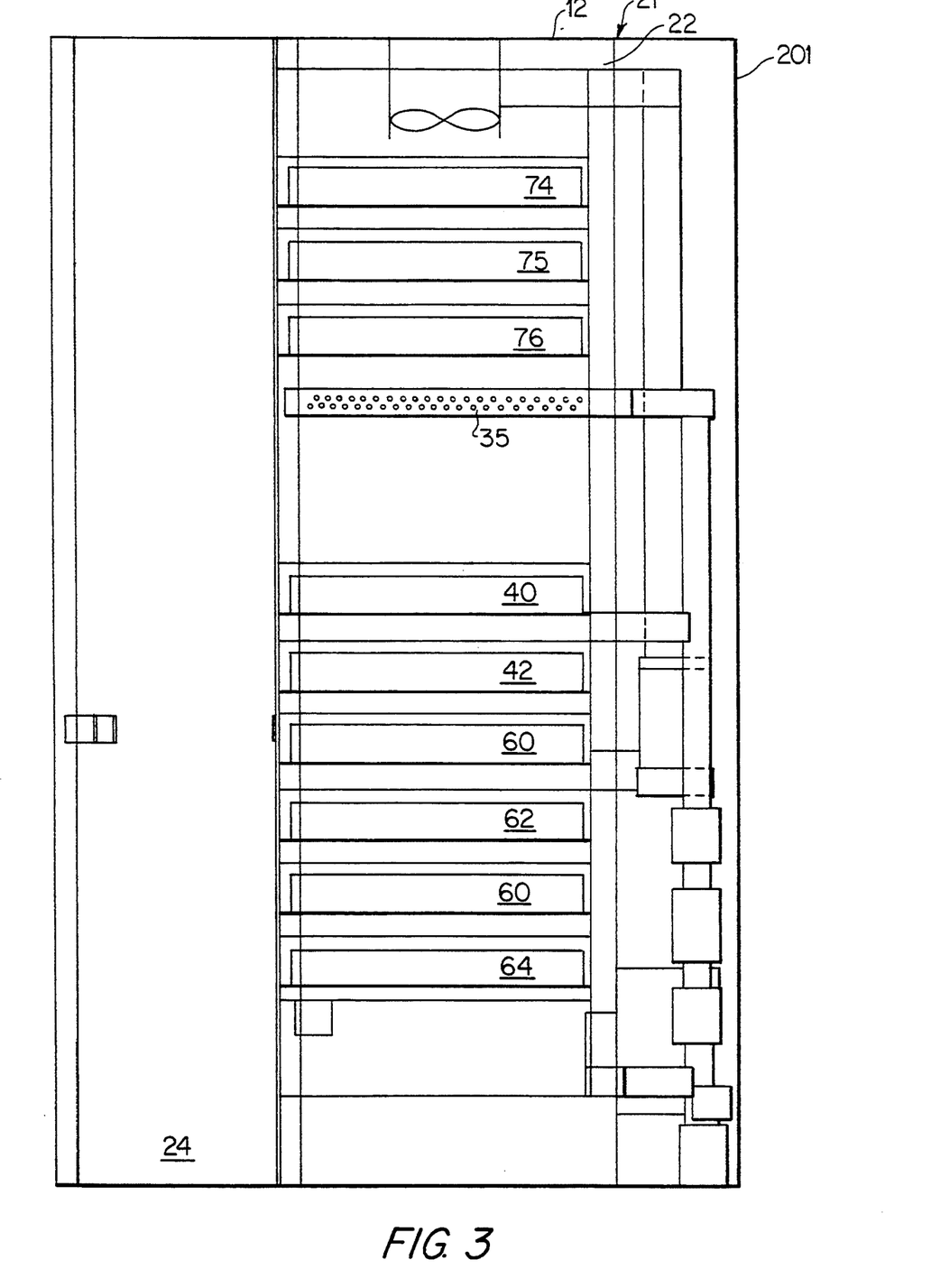
FIG. 3 is a side elevation of a further embodiment of a bioreactor unit of the invention.

In FIG. 3, a side elevation further embodiment of bioreactor unit 12 is shown. Bioreactor unit 12 comprises biotreatment chamber 21 and accessory compartment 201, the components of which are described in further detail in FIG. 4. Biotreatment chamber 21 is accessible through hinged full-length locking door 24. Biotreatment chamber 21 also includes a vertically extending housing unit 22, particulars of which have been described previously. Inside biotreatment chamber 21 are located waste water inlets 35 and 36 (only 35 is shown), recycle fan 38, a plurality of sedimentation trays 40 and 42, water treatment trays 60, 62 and 64 and off-gas treatment trays 74, 75 and 76, which can all be easily removed from housing unit 22 for either cleaning purposes or for replenishing the contact media required for the growth of hydrocarbon consuming microorganisms.

Figure 4:
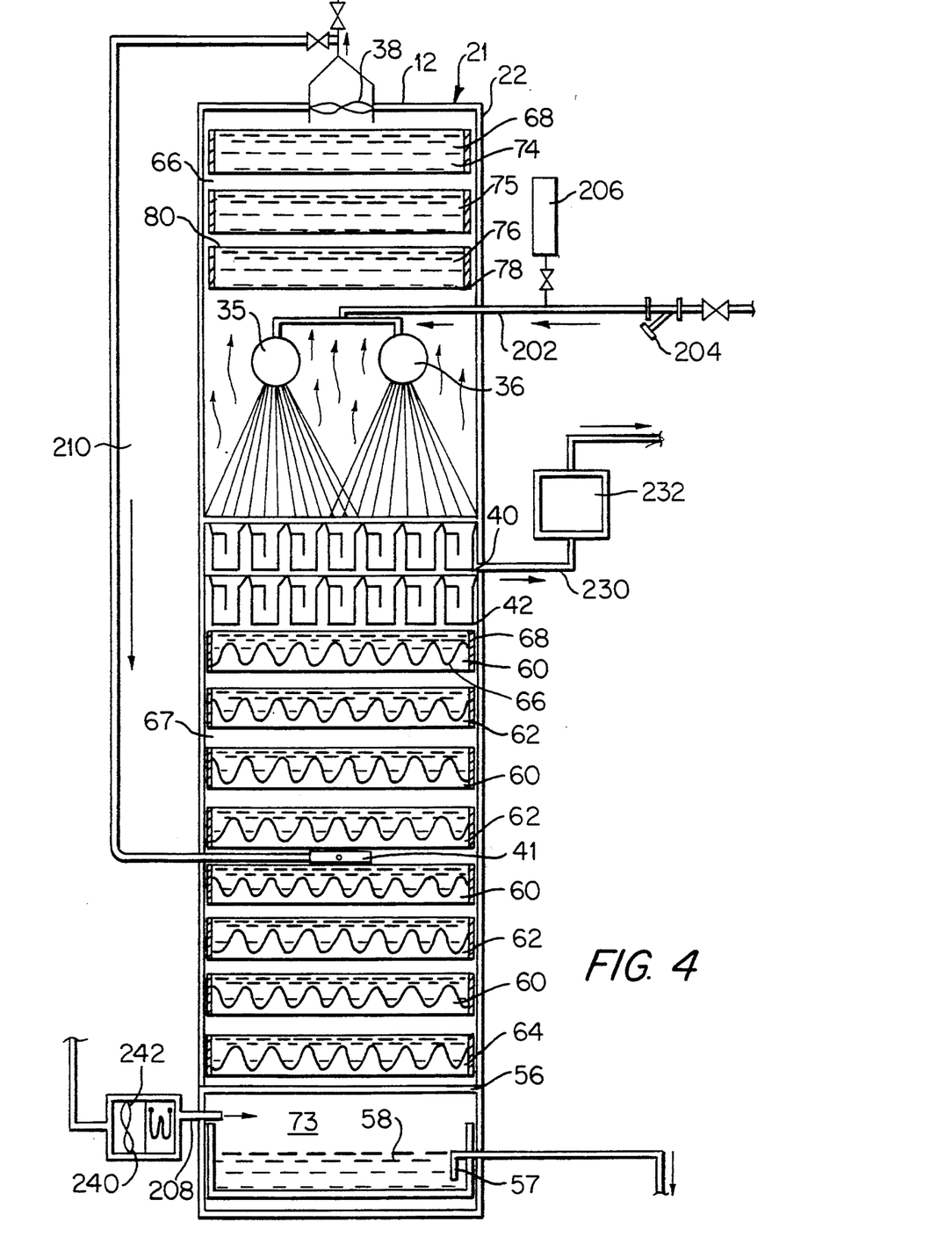
FIG. 4 is a schematic front view in section of the embodiment of the bioreactor unit of the invention shown in FIG. 3.

In FIG. 4, bioreactor unit 12 is shown schematically in further detail. It comprises a biotreatment chamber 21 which includes vertically extending housing unit 22, waste water inlets 35 and 36 connected by water inlet pipe 202 to valve 203 and strainer 204 for removal of sediments. Water inlet pipe 202 is also linked to nutrient dispenser 206.

Biotreatment chamber 21 also comprises, in its upper portion, above water inlet means 35 and 36, a plurality of off-gas treatment trays 74, 75 and 76. Off-gas treatment trays 74, 75 and 76 have a porous bottom section 78 adapted to receive contact media bed 68 and a top porous section 80 adapted to retain the contact media bed 68. Recycle fan 38 is connected to gas inlet pipe 210 for redistribution of gases in biotreatment chamber 21 through gas distributor 41. A gas outlet 230 evacuates excess gases in biotreatment chamber 21 to gas polishing unit 232.

In the bottom portion of biotreatment chamber 21 are included two sedimentation trays 40 and 42 which each comprise a plurality of sedimentation cups 44 which are described in further detail at FIGS. 6 and 7. A plurality of water treatment trays identified by reference numerals 60, 62 and 64 are also provided. Each of water treatment trays 60, 62 and 64 has a porous bottom section 66 adapted to receive contact media bed 68 which consists of naturally occurring vegetation having a high surface area to volume characteristic to allow for optimal biological activity. Off-gas treatment trays 74, 75 and 76, sedimentation trays 40 and 42 and treatment trays 60, 62 and 64 in biotreatment chamber 21 are separated from each other by vapor spaces 67 and are removable in drawer-like fashion when bioreactor unit 12 is not in operation.

At the bottom of biotreatment chamber 21 is air flow means in the form of heater fan 240 which provides fresh ambient air through air inlet 208 into vapor space 73. Also provided is a perforated air distributor plate 56 located upwardly from vapor space 73. Heater fan 240 can be equipped with a thermostat control heater 242 to maintain the temperature inside biotreatment chamber 21 ranging between 20° and 25° C. during use of bioreactor unit 12 in cold weather conditions, by providing heated air in biotreatment chamber 21. When heat is not required, heater fan 240 operates only to deliver ambient air required by the active biomass residing on contact media bed 68. Also at the bottom of housing unit 22 is an effluent basin 58 connected to water outlet means 55.

Referring now to FIG. 5, a series of water treatment trays 60, 62 and 64 are shown in further detail. Each of the water treatment trays 60, 62 and 64 freely rests on supports 65 which seal and prevent the bypassing of water or off-gases around the sides of water treatment trays 60, 62 and 64. The front and back end panels (not shown) of treatment trays 60, 62 and 64 consist of full-length solid plastic plates. A gasket of hydrocarbon-resistant foam-like material (not shown) runs the entire length of the two-end panels, firmly touching the inside backwall of housing unit 22 and the inside of door 24 (see FIGS. 1 and 3), thereby ensuring a tight seal to prevent seeping of water or off-gases around the trays and along the walls of housing unit 22. It ensures the passage of water and off-gases only through the contact media beds 68.

The porous bottom section 66 of each of water treatment trays 60, 62 and 64 is composed of a mesh work of parallel or woven-type plastic or wire on which contact media bed 68 is supported. It should be mentioned that the plastic or metal bottoms of the treatment trays 60, 62 and 64 are not, in themselves, involved in the treatment process. They mainly serve as support means for the organic contact media. Water treatment trays 60, 62 and 64 preferably have a wavy-shaped bottom to amplify the high surface area of contact media bed 68, thereby allowing for maximum exposure to the oxygenated environment and enhancement of biological activity for the bacterial strains growing on contact media. The bottom of the water treatment trays 60, 62 and 64 can be flat but the wavy pattern enables the trays to be staggered from each other. The wave lows 61 of water treatment tray 60 are offset from the wave highs 65 of water treatment tray 62 to reduce channelling and to provide for optimal distribution of water throughout water treatment trays 60, 62 and 64. This is a meaningful aspect of the bioreactor unit of the present invention.

The contact media bed 68 provided on each of water treatment trays 60, 62 and 64 consists of naturally occurring organic vegetation having a high surface area to volume characteristic which favours absorption and adsorption of hydrocarbons for optimal degradation by microorganisms. The presence of contact media bed 68 is important as it improves the efficiency and rapidity with which microorganisms can treat hydrocarbons by favoring bacterial growth. The contact media bed 68 is preferably a combination of rigid naturally occurring organic matter as a bulking agent and for structural support, and a softer, porous and pliable naturally occurring organic matter as a growth agent which is more assimilable by microorganisms. An example of rigid matter is straw and an example of soft, porous and pliable matter is peat moss.

The above characteristics set forth with regard to water treatment trays 60, 62 and 64 and contact media bed 68 in FIG. 5 are equally applicable to the off-gas treatment trays 74, 75 and 76 (see FIGS. 3 and 4), except that the bottom porous section 78 (see FIG. 4) of off-gas treatment trays 74, 75 and 76 is preferably flat and not wavy and each off-gas treatment trays 74, 75 and 76 has a flat porous top section 80 (see FIG. 4).

The combined use of contact media bed and the treatment trays according to the invention allows for fast attainment of optimal equilibrium conditions. Furthermore, the contact media bed treatment tray combination is important because it allows the incorporation of an air treatment mode by which air can be circulated and passed through the treatment trays with the recycle and heater fans. The ability to cost effectively treat hydrocarbon contaminated off-gases increases the flexibility and the attractiveness of the bioreactor.

FIG. 6 illustrates sedimentation trays 40 and 42 in further detail. Because the waste water to be treated can be loaded with heavy metals, the contact media may, after some time, become toxic to hydrocarbon degrading microorganisms. Sedimentation trays are optionally used to prevent this occurrence. Furthermore, the use of sedimentation trays avoids fouling and plugging of the contact media with precipitating metals and slimes, which would otherwise create channelling and inefficiency in the treatment process. The number of sedimentation trays in the bioreactor unit can vary depending on the level of metal contaminants of the waste water to be treated. The sedimentation trays are therefore interchangeable with water treatment trays.

Referring now to FIG. 6, each of sedimentation trays 40 and 42 consists of a plurality of sedimentation cups 43 which can be made of inexpensive disposable plastic material. Each sedimentation cup 43 comprises a metal receiving cup 44 and water deflector 45 preferably made of a unitary piece of injection molded plastic. Water deflector 45 includes an air/water deflecting portion having an upper air/water deflector portion 46 and a lower air/water deflector portion 47 disposed to create air plot therebetween and a water deflector portion 48.

As shown in FIG. 7, water deflector portion 48 is square with a semi-circular opening 50 which exposes the right side of metal receiving cup 44. It actually acts as a snap-on cap-like cover for metal receiving cup 44.

Referring back to FIG. 6, lower air/water deflector portion 47 slopes downward and descends into the exposed right side of metal receiving cup 44. Lower air/water deflector portion 47 is connected to a vertical baffle 49. Upper air/water deflector portion 46 and lower air/water deflector portion 47 are disposed such as to form an airstream slot 51. On the left side of metal receiving cup 44 is provided a slot 53.

Thus, when it is necessary to use the sedimentation trays shown in FIG. 6 to remove metals present in the waste water to be decontaminated, the waste water enters the right side of metal receiving cup 44 either directly or after deflection by upper air/water deflector portion 46, lower air/water deflector portion 47 and water deflector portion 48. Before entering metal receiving cup 44, waste water comes in contact with a rising air stream that passes through air slot 51 between lower air/water deflector portion 47 and upper air/water deflector portion 46 as shown by arrow 55. This gas/liquid contact further oxidizes the water and promotes precipitation of metals for collection in metal receiving cup 44.

The position of vertical baffle 49 forces water to flow to the bottom of the right side of metal receiving cup 44 and around the submersed portion of vertical baffle 49 before rising on the left side of metal receiving cup 44. The water then exits through slot 53. This ensures no bypassing of water directly to slot 53 on metal receiving cup 44, increasing the residence time in metal receiving cup 44 and thus allowing for maximum precipitation of metals within metal receiving cup 44. If required, a second sedimentation tray 42 can be used to further cause precipitation of metals. Water exiting from slot 53 on sedimentation cup 44 of sedimentation tray 40 flows down to upper and lower air/water deflector portions 46 and 47 of sedimentation tray 42 after having been intimately contacted by the rising air/gas stream passing through airstream slot 51 before entering metal receiving cup 44 of sedimentation tray 42. This gas/liquid contact further oxidizes the water, promoting additional precipitation of metals in metal receiving cup 44 of sedimentation tray 42.

When it is desired to operate the bioreactor unit shown in FIG. 4, pressurized hydrocarbon contaminated waste water is pumped towards biotreatment chamber 21 through inlet pipe 202, valve 203 and strainer 204 for removal of sediments. If desired, nutrients may be loaded to the waste water from nutrient dispenser 206 before the waste water is discharged under pressure through waste water inlets 35 and 36 downwards to sedimentation trays 40 and 42. Waste water inlets 35 and 36 discharge contaminated water jets 19 equally across sedimentation tray 40 to favor optimal recovery of precipitated metals prior to the biological treatment. Water then flows downwards onto sedimentation tray 42 and trickles downward onto first treatment tray 60.

Volatilizing hydrocarbon gases released from contaminated water jets 19 pass through off-gas treatment trays 74, 75 and 76 for partial treatment before being recovered by recycle fan 38 for redistribution by means of gas inlet pipe 210 and are discharged in biotreatment chamber 21 through gas distributor 41 located in the central portion of biotreatment chamber 21. Gas recycling increases the efficiency of the treatment system by minimizing the amount of heated fresh air required during winter months as well as increasing the efficiency of the sedimentation trays.

Recycled gases enter biotreatment chamber 21 through gas distributor 41 and flow upwards through water treatment trays 60 and 62. A portion of the recycled gases exit biotreatment chamber 21 through gas outlet pipe 230 and enter into a gas polishing unit 232 containing organic matter or granular activated carbon to remove residual hydrocarbons prior to exiting into the atmosphere.

The concept of recycling gases is important because it minimizes heated fresh air requirements during winter and maximizes the mass transfer of oxygen in the recycled gas into the biomass residing in and on the contact media. Thus, gas recycling reduces electrical heating costs during cold weather operation of the bioreactor as well as the size of the polishing unit. Also, it increases treatment efficiency and allows for increased water throughput, as the limiting constraint in hydrocarbon degradation reactions is normally a deficiency in oxygen. Furthermore, recycled gases increase the temperature of waste water being sprayed over the treatment trays to in (^ \ *e the rate of the degradation reaction. The higher gas flow rate also results in an improvement in the sedimentation tray efficiency, as the waste water passing through the sedimentation trays will be more oxygenated resulting in greater metals precipitation.

Referring back to FIG. 4, once waste water has past sedimentation trays 40 and 42, it passes through contact media bed 68 on water treatment tray 60 and flows through porous section 66 onto contact media bed 68 supported by water treatment tray 62 and continues in like fashion from one successive water treatment tray to another. Microorganisms on contact media bed 68 consume contaminants present in water or air during normal metabolic activity, thereby converting organic pollutants to biomass cell material, carbon dioxide and water. These microorganisms are predominantly naturally occurring strains of soil bacteria such as pseudomonas and corynebacterium. The hydrocarbon-consuming strains are predominant on the contact media bed. In order to maintain the growth of the microbial population present on the contact media bed 68, heater fan 240 is activated to supply fresh ambient air. The fresh air enters into vapor space 73 and is forced through perforated air distribution plate 56 upwards through treatment trays 64, 62 and 60. Treated water passing through bottom treatment tray 64 and captured in effluent basin 58 is then discharged from biotreatment chamber 21 through water outlet 57 for disposal into a sewer system or water course or for reinjection into the soil.

When treating hydrocarbon contaminated waste water using the bioreactor of the present invention, excess bacterial mass is sheared off the contact media and carried off with the treated water. The effluent water therefore contains high loads of specific strains of naturally occurring hydrocarbon consuming bacteria which can enhance the treatment of hydrocarbon contaminated soil or water.

EXAMPLE 1

Experimental bioreactor unit

A field bioreactor unit was constructed in 1991 to evaluate the scientific value of using peat moss on trays in a confined space to treat low quantities of gasoline contaminated groundwater. A sectional sketch of the original bioreactor unit without the heater fan, installed for winter time operation, is presented in FIG. 8. It comprises a housing unit 100 having a first plexiglass panel 102. Within housing unit 100 is a waste water nozzle 104 through waste water is discharged. Three water treatment trays 106, 108 and 100 with mesh screen bottom 112 having thereon contact media bed 114 (peat moss) are disposed horizontally underneath waste water nozzle 104. Water outlet 116 is provided at the bottom portion of housing unit basin 118 for retrieval of treated water. Housing unit 100 is not hermetically sealed and a suitable air flow is provided to create the desired aerobic environment.

Figure 8:
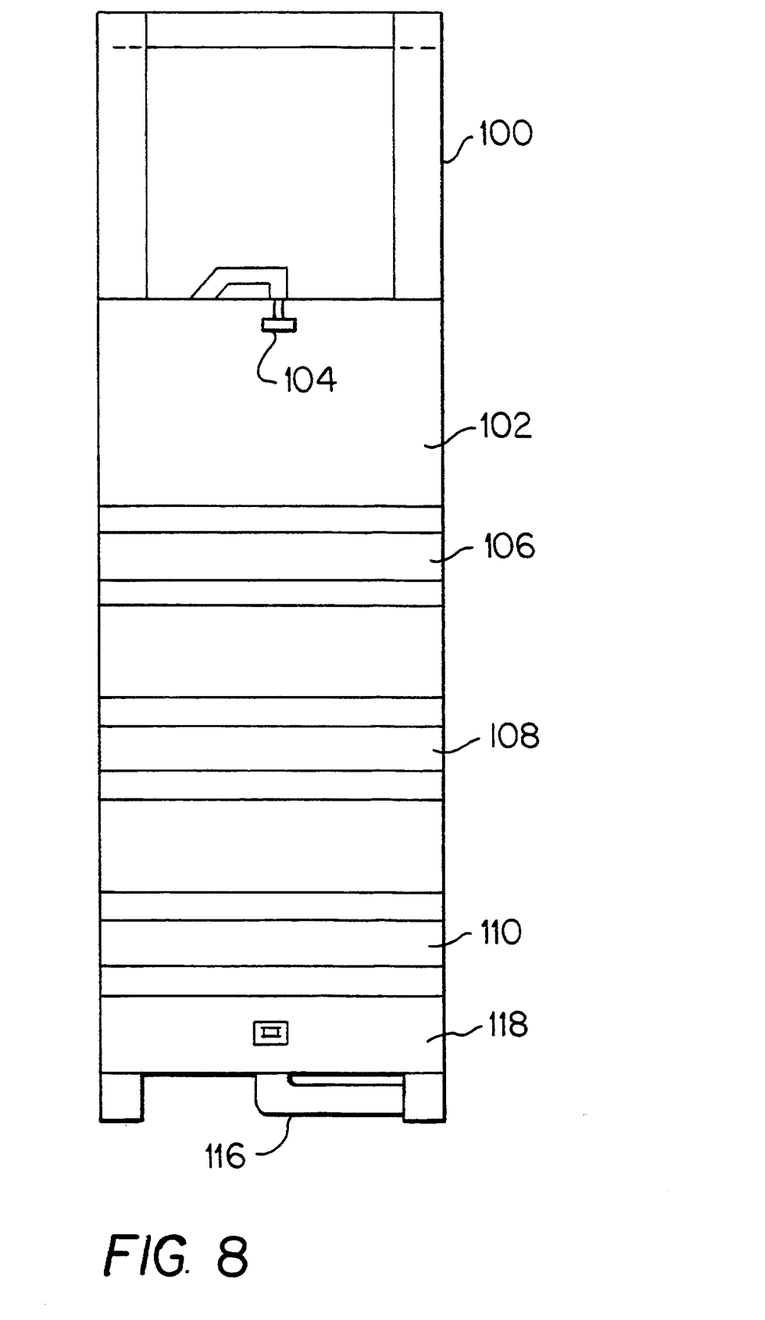
FIG. 8 is a schematic front view in section of a simplified embodiment of the bioreactor unit of the invention.

To date, the bioreactor unit has treated approximately 5000 to 12000 liters per day (depending on the time of year) of gasoline contaminated water. The contaminant load in this water has ranged from 3.2 to 28.0 mg/l and has averaged 11.25 mg/l over a period of 20 months. Typical laboratory reports are included in Tables 1 and 2 and show hydrocarbon levels in waste water, when entering the bioreactor unit, after passing through water treatment trays 106, 108 and 110 and after a residence time of about 5 to 10 minutes in housing unit basin 118. Laboratory results for microorganisms in the peat moss and water are included in Table 3. Microbial Analysis has demonstrated the presence of 3,000,000 aerobic mesophile bacteria. Bacterial strains present include pseudomonas and corynebacterium.

The bioreactor unit has operated successfully during 1½ years with only minor problems of channelling. The bioreactor unit efficiency rate has ranged from 99.8 to 100% during this time.

TABLE 1

Analysis of hydrocarbons present in waste water sample #1 at various phases of treatment

| Sample #1 location | Benzene | Toluene | Ethyl Benzene | Xylenes | Higher Alkyl Benzenes | Naphthalene | Fuel Oil |
|---|---|---|---|---|---|---|---|
| Bioreactor inlet | 3500 | 2200 | 340 | 1900 | 1100 | 70 | — |
| Tray 106 outlet | 1400 | 820 | 100 | 640 | 400 | 45 | — |
| Tray 108 outlet | 24 | 9.8 | .6 | 6.5 | 2.2 | — | — |
| Tray 110 outlet | — | — | — | — | — | — | — |
| Housing unit basin outlet | — | — | — | — | — | — | — |

'—': not detected, less than 0.4 ppb for each component in water.
Bioreactor inlet: hydrocarbon levels prior to treatment.
Tray 106 outlet: hydrocarbon levels after passage through water treatment tray 106.
Tray 108 outlet: hydrocarbon levels after passage through water treatment trays 106 and 108.
Tray 110 outlet: hydrocarbon levels after passage through water treatment trays 106, 108 and 110.
Housing unit basin outlet: hydrocarbon levels after residence in housing unit basin 118.

TABLE 2

Analysis of hydrocarbons present in waste water sample #2 at various phases of biotreatment

| Sample #2 location | Benzene | Toluene | Ethyl Benzene | Xylenes | Higher Alkyl Benzenes | Naphthalenes | Total Petroleum Hydrocarbon |
|---|---|---|---|---|---|---|---|
| Bioreactor outlet | 220 | 150 | 8.7 | 350 | 270 | 11 | 5000 B |
| Tray 106 outlet | — | — | — | .5 | 20 | — | 88 B |
| Tray 108 outlet | — | — | — | — | 5.4 | — | 64 B |
| Tray 110 outlet | — | — | — | — | 14— | — | 95 B |
| Housing unit basin outlet | — | — | — | — | — | — | — |

Note:
Detection limit = 0.4 ppb for each aromatic component; 10 ppb TPH (as gasoline), 40 ppb TPH (as fuel oil).
B as Gasoline.
'—': Not detected.
Bioreactor inlet: hydrocarbon levels prior to treatment.
Tray 106 outlet: hydrocarbon levels after passage through water treatment tray 106.
Tray 108 outlet: hydrocarbon levels after passage through water treatment trays 106 and 108.
Tray 110 outlet: hydrocarbon levels after passage through water treatment trays 106, 108 and 110.
Housing unit basin outlet: hydrocarbon levels after residence in housing unit basin 118.

TABLE 3

Numbering of bacterial populations in peat moss and in water before and after treatment

| # Sample | Total Bacteria/ gr. 20° C. |
|---|---|
| Tray 106 peat level | 4,600,000 |
| Tray 108 peat level | 2,400,000 |
| Tray 110 peat level | 1,100,000 |
| Inlet water sample | 15,000/ml. |
| Effluent water sample | 500,000/ml. |

We claim:

1. A bioreactor unit for the aerobic biological treatment of hydrocarbon contaminated waste water and off-gases, said bioreactor comprising a biotreatment chamber which comprises:

a vertically extending housing unit forming walls, floor and ceiling of said biotreatment chamber, said housing unit comprising a door for accessing said treatment chamber;

waste water inlet means for discharging waste water under pressure from an upper portion of said biotreatment chamber;

a plurality of superimposed water treatment trays disposed substantially horizontally in said housing of said biotreatment chamber and below said waste water inlet means, said water treatment trays being adapted for retrieval from said biotreatment chamber through said door of said housing unit, each of said water treatment trays having at least one bottom porous section containing an organic contact media, said organic contact media comprising naturally occurring organic vegetative matter, said organic contact media acting to retain and favor growth of microorganisms having the ability to degrade hydrocarbons in said waste water, said water treatment trays being disposed in said biotreatment chamber in a stationary relationship during treatment to permit intimate successive contact of said waste water with said organic contact media on each of said water treatment trays for gradual treatment of said waste water, as said waste water flows downwards in said biotreatment chamber;

water outlet means substantially at a bottom of said biotreatment chamber for discharging treated waste water from said biotreatment chamber;

air flow means for creating an aerobic environment in said biotreatment chamber, said air flow means being adapted to provide air flow through said water treatment trays in said biotreatment chamber; and air outlet means for removing air introduced in said biotreatment chamber through said air flow means.

2. The bioreactor unit according to claim 1, wherein said water treatment trays have a wavy-shaped bottom porous section to enhance biological activity of said microorganisms retained by said organic contact media and, when in position in said biotreatment chamber, are in sealing relationship with said biotreatment chamber to prevent seeping of water or gases around said trays and along the walls of said housing unit.

3. The bioreactor unit according to claim 2, wherein said water treatment trays are successively staggered from each other in order that the wave lows of one water treatment tray are offset from the wave highs of the subsequent water treatment tray, thereby reducing channelling and providing optimal distribution of water throughout the water treatment trays.

4. The bioreactor unit according to claim 1, wherein said organic contact media is a combination of rigid naturally occurring organic matter acting as a bulking agent and softer, porous and pliable naturally occurring organic matter acting as a growth agent for said microorganisms.

5. The bioreactor unit according to claim 4, wherein said organic contact media is a combination of straw and peat moss.

6. The bioreactor unit according to claim 1, wherein said bioreactor unit further comprises an accessory compartment adjacent to and sealed from said biotreatment chamber, said accessory compartment comprising auxiliary equipment operatively linked to said waste water inlet means and said air flow means to allow for the operation of said bioreactor.

7. The bioreactor unit according to claim 1, wherein said air flow means further comprises: a heater fan to provide fresh or heated ambient air in said biotreatment chamber.

8. The bioreactor unit according to claim 7, wherein said heater fan is located substantially at the bottom of said biotreatment chamber.

9. The bioreactor unit according to claim 8, wherein said biotreatment chamber comprises means for distributing air above said water outlet means and said heater fan and below said water treatment trays, said air distributing means acting to provide even air contact with said organic contact media on said treatment trays.

10. The bioreactor unit according to claim 7, wherein said heater fan is located substantially at the top of said biotreatment chamber.

11. The bioreactor unit according to claim 1, wherein said biotreatment chamber further comprises containment means for capturing precipitated metals in said waste water to be treated.

12. The bioreactor unit according to claim 11, wherein said containment means are in the form of a plurality of sedimentation cups disposed on a horizontal sedimentation tray which is located between said waste water inlet and said treatment trays.

13. The bioreactor unit according to claim 12, wherein said sedimentation cups comprise:
a metal receiving cup comprising a water outlet; and
a water deflector which comprises:
an air/water deflector portion comprising a lower air/water deflector portion and an upper air/water deflector portion deposed to create an air slot therebetween; and
a water deflecting portion;
said water deflecting portion being of square shape with an opening which exposes half of said metal receiving cup through which said waste water enters, said deflector being secured to said sedimentation cup, said lower air/water deflector portion comprising a water deflection portion secured to said sedimentation cup at one end and a vertical baffle secured to the other end of said water deflection portion, said waste water entering said metal receiving cup through said opening, circulating in said metal receiving cup around said vertical baffle, whereby precipitated metals are deposited at the bottom of said receiving cup, said waste water then exiting said sedimentation cup through said waste water inlet.

14. The bioreactor unit according to claim 1, wherein said biotreatment chamber further comprises; biofilter means disposed above said waste water inlet means for the treatment of volatilizing off-gases released from said waste water discharged in said biotreatment chamber.

15. The bioreactor unit according to claim 14, wherein said biofilter means comprises a plurality of superimposed off-gas treatment trays disposed substantially horizontally in said biotreatment chamber and above said waste water inlet means, said off-gas treatment trays being adapted for retrieval from said biotreatment chamber through said door of said housing unit, each of said off-gas treatment trays having at least one bottom porous section adapted to receive said organic contact media, said organic contact media acting to retain and favor growth of microorganisms having the ability to degrade volatile hydrocarbons released from said waste water as off-gases, said trays being disposed in said biotreatment chamber in a stationary relationship during treatment to permit successive contact of off-gases with organic contact media on each of said off-gas treatment trays for gradual treatment of said off-gases, as said off-gases flow upwardly in said biotreatment chamber.

16. The bioreactor unit according to claim 15, wherein said bioreactor further comprises a gas recycling means, said recycling means comprising:
 a recycle fan disposed substantially at a top of said biotreatment chamber for recovering off-gases released from said waste water after said off-gases have been treated by passage through said off-gas treatment trays; and
 a gas outlet for releasing said off-gases in said biotreatment chamber.

* * * * *

REEXAMINATION CERTIFICATE (3639th)
United States Patent [19]

Paréet al.

[11] B1 5,389,248

[45] Certificate Issued  Sep. 29, 1998

[54] BIOREACTOR FOR BIOLOGICAL TREATMENT OF CONTAMINATED WATER

[75] Inventors: François Paré, Montreal; John Hart, Fredericton, both of Canada

[73] Assignee: Bioremetek, Inc., Montreal, Canada

Reexamination Request:
No. 90/004,571, Feb. 25, 1997

Reexamination Certificate for:
Patent No.: 5,389,248
Issued: Feb. 14, 1995
Appl. No.: 66,308
Filed: May 21, 1993

[51] Int. Cl.$^6$ .................................................. C02F 3/10
[52] U.S. Cl. ........................ 210/151; 210/180; 210/194; 210/521; 95/274
[58] Field of Search ................................. 210/615, 616, 210/150, 151, 180, 194, 521; 261/112.1, 112.2; 95/274, 900

[56] References Cited

FOREIGN PATENT DOCUMENTS

| | | |
|---|---|---|
| A-3805615 | 8/1989 | Germany. |
| A-4207084 | 9/1992 | Germany. |

OTHER PUBLICATIONS

International Search Report dated Sep. 14, 1994, for International Application No. PCT/CA94/00282, filed May 18, 1994.

*Primary Examiner*—Thomas Wyse

[57] ABSTRACT

The invention relates to a bioreactor unit for the aerobic biological treatment of hydrocarbon contaminated waste water and off-gases. The bioreactor comprises a biotreatment chamber comprising a vertically extending housing unit forming the walls, floor and ceiling of the biotreatment chamber. The housing unit also comprises a door for accessing the biotreatment chamber. The biotreatment chamber also comprises waste water inlet means for discharging waste water under pressure from the upper portion of the biotreatment chamber, onto a plurality of superimposed water treatment trays disposed substantially horizontally inside the chamber, the water treatment trays being adapted for retrieval from the biotreatment chamber through the door of the housing unit. Each water treatment tray has at least one bottom porous section adapted to receive contact media. The contact media on the porous section of the water treatment trays acts to retain and favor the growth of microorganisms having the ability to degrade hydrocarbons. The water treatment trays are disposed in the biotreatment chamber in a stationary relationship during treatment to permit initmate successive contact of waste water and off-gases with contact media on each of the trays for gradual treatment of the waste water, as the waste water flows downwards in the biotreatment chamber. The biotreatment chamber also comprises a water outlet substantially at the bottom of the biotreatment chamber for discharging treated waste water, air flow means to create an aerobic environment in the biotreatment chamber, air flow means being adapted to provide an air flow through the water treatment trays and air outlet means for removing air introduced in the biotreatment chamber through the air flow means.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 11 is cancelled.

Claim 1 and 12 are determined to be patentable as amended.

Claims 2-10 and 13-16, dependent on an amended claim, are determined to be patentable.

12. The bioreactor unit according to claim [11.] *1*, wherein said containment means are in the form of a plurality of sedimentation cups disposed on a horizontal sedimentation tray which is located between said waste water inlet and said treatment trays.

* * * * *